Sept. 15, 1959     A. VISCHER, JR     2,904,212
PRESSURIZED VESSEL

Filed July 31, 1956     2 Sheets-Sheet 1

INVENTOR
ALFRED VISCHER JR.
BY
Mason, Kolehmainen, Rathburn and Wyss.
ATTORNEYS

Sept. 15, 1959
A. VISCHER, JR
2,904,212
PRESSURIZED VESSEL
Filed July 31, 1956
2 Sheets-Sheet 2
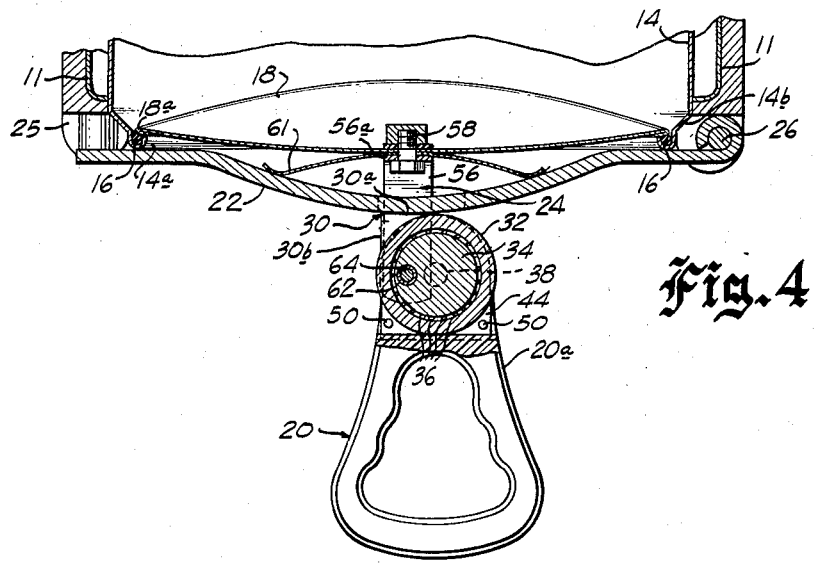
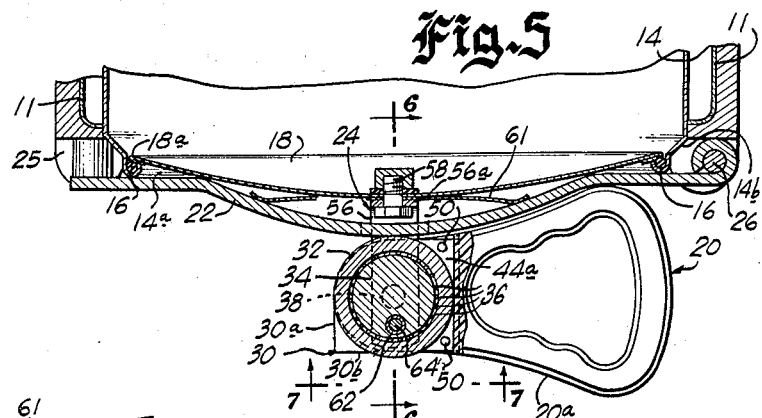
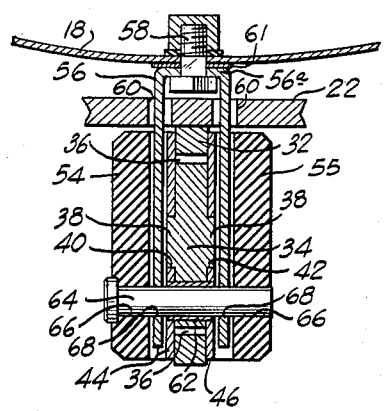
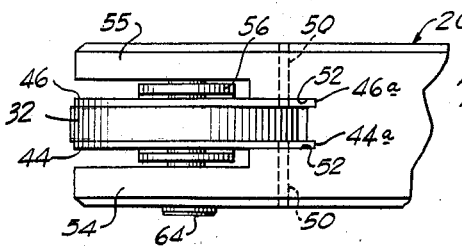
INVENTOR
ALFRED VISCHER JR.
BY
Mason, Kolehmainen, Rathburn and Wyss.
ATTORNEYS

United States Patent Office 2,904,212
Patented Sept. 15, 1959

2,904,212

PRESSURIZED VESSEL

Alfred Vischer, Jr., Park Ridge, Ill., assignor of two thirtieths to William Vischer, two thirtieths to Alfred Vischer III, two thirtieths to Peter Vischer, four thirtieths to Walter W. Zitzewitz, four thirtieths to Elmer K. Zitzewitz, one thirtieth to Gertrude J. Zitzewitz, one thirtieth to Barbara O. Zitzewitz, and two thirtieths to Gertrude V. Bonton Application July 31, 1956, Serial No. 601,264

10 Claims. (Cl. 220—25)

The present invention relates to pressurized vessels, and more particularly to pressurized vessels of the type employing a flexible closure member such as the one disclosed in my prior Patent No. 2,282,011.

There are several types of pressure cookers now on the market. One of these is an improved cooker which has been eminently successful and which is constructed in accordance with the teachings of said patent. As disclosed therein, the closure member, or cover, is of the inside fitting type having a diameter greater than that of the opening of the vessel which it is designed to seal. In order to provide for easy passage of the cover into and out of the inside of the vessel, the cover is made from a flexible resilient material, such as stainless steel, and it is warped into a shape such that it can be passed through the opening in the vessel. The warped shape is preferably one projecting an elliptical form with major and minor axes, of which the latter is smaller than the diameter of the opening in the vessel. The cover can be warped into this shape by internal stressing as disclosed, for example, in my Patent No. 2,454,758. Once inside the vessel, the cover is caused to assume an operative or unwarped shape in which it projects a circular form so that its outer edge is seated into sealing engagement with the rim of the vessel which is provided with a seat defining surface. This change in shape is effected by the application of an upward or outward force to the cover, which, when applied, snaps the cover into its unwarped operative shape and into sealing relationship with the seat on the rim of the vessel.

Pressure cookers and other appliances provided with flexible warped covers of the foregoing type have been widely accepted and used. Some have voiced objections to them on the ground that too much force is required to change the shape from the warped to the unwarped operative shape. This has indeed been a disadvantage, particularly with women, many of whom cannot, except with difficulty, exert sufficient force to close the cover of a domestic pressure cooker. This disadvantage has been minimized somewhat by making the covers from thin material. This, however, is objectionable because of the resultant decrease in the pressure which can be safely maintained inside the vessel. Contrariwise, if the cover is made of heavier material so as to withstand higher pressures, then the cover becomes less flexible and harder to change from its warped shape to its unwarped operative shape.

Nevertheless, when the flexible type of cover is used to close a vessel which must be operated at relatively high pressures, such as, for example, sterilizers or the like, it is desirable to construct the cover of heavy material, and some mechanism must be provided for facilitating the closure and opening operation. In my above noted Patent No. 2,282,011 and in another of my patents, No. 2,538,661, two mechanisms for facilitating flexing of the covers are disclosed. Although the mechanisms described in these patents operate satisfactorily with the smaller type cookers or autoclaves with which they are intended to be used, it is desirable to provide an improved mechanism for use with the larger type units which operate at higher pressures and employ heavier covers.

Accordingly, a principal object of the present invention is to provide a new and improved mechanism for facilitating the flexure of the above described type of cover during the opening and closing of a vessel.

Another object of the present invention is to provide a new and improved means for sealing a container by means of a flexible cover.

A further object of the present invention is to provide an improved cam assembly for use in connection with flexible covers for pressurized vessels.

Another object of the present invention is to provide an improved cam assembly.

Briefly, the above and further objects are realized in accordance with the present invention by providing a compact camming assembly comprising two separate operative cam portions, a first cam portion for moving the flexible cover into engagement with an annular seat on a vessel and a second cam portion for flexing the cover into tight sealing engagement with the seat. Also, there is provided an intermediate cam surface between the first and second cam portions which permits the stable positioning of the camming assembly between the two operative cam portions.

Further objects and advantages of the present invention will become apparent as the following description proceeds, and the features of novelty which characterize the invention will be pointed out with particularity in the claims annexed to and forming a part of this specification.

For a better understanding of the present invention, reference may be had to the accompanying drawings, in which:

Fig. 4 is a side elevational view partially in section of the device of Fig. 1 showing the camming assembly in an intermediate position;

Figure 1:
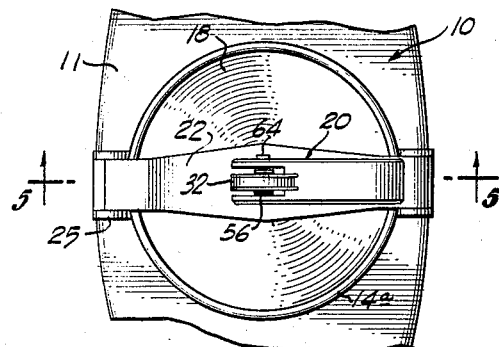
Fig. 1 is a fragmentary front elevational view of an autoclave embodying the present invention.

Fig. 5 is a side elevational view partially in section of the device of Fig. 1 taken along the line 5—5 thereof showing the vessel in a closed condition; and Figs. 6 and 7 are sectional views respectively taken along the lines 6—6 and 7—7 of Fig. 5.

Referring now to the drawings, and particularly to Figs. 1–5 thereof, there is shown a portion of a pressurized vessel 10 comprising a housing 11 for supporting a cylindrically shaped vessel 14. A circular access opening in the vessel 14 is defined by an annular lip 14a which carries a resilient O ring or gasket 16. The gasket 16 this provides a seat against which a flexible cover 18 is pressed to close and hermetically seal the vessel 14. The cover 18, which is preferably a thin stainless steel dished circular disk containing internal warping stresses, has a peripheral lip or beaded edge 18a which strengthens the cover and engages the gasket 16 when the vessel 14 is sealed. The bead 18a is substantially elliptical in projection when the cover is warped and circular when the cover is unwarped, as shown in Fig. 1. It is apparent from the view of the warped cover 18 shown in Figs. 2 and 3 that when the cover is warped it has a concave inner surface and a convex outer surface and by virtue of the undercut 14b in the vessel 14 near the lip 14a may be easily inserted into the opening in the vessel 14. The cover 18 may be flexed from its warped to its unwarped condition by positioning the bead 18a against the gasket 16 and then pulling outwardly on the center portion of the cover 18 so as firmly to press the bead 18a against the gasket 16. Therefore, as the center portion of the cover 18 is thus withdrawn from the vessel 14, the cover 18 is flexed from the warped shape to the spherical unwarped shape and an airtight seal is effected between the bead 18a and the gasket 16.

In order manually to provide the necessary force on the cover 18 to flex it to the unwarped spherical shape shown in Figs. 1 and 5 there is provided in accordance with this invention a manually operable camming assembly 20, a pivotally mounted cross-brace 22, and a bracket 24 which connects the central portion of the cover 18 to the camming assembly 20.

Figure 2:
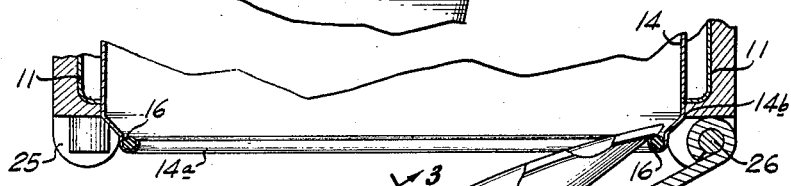
Fig. 2 is a partial sectional view of the autoclave of Fig. 1 showing the cover in an intermediate position while being inserted into the vessel prior to the closure thereof.
Figure 3:
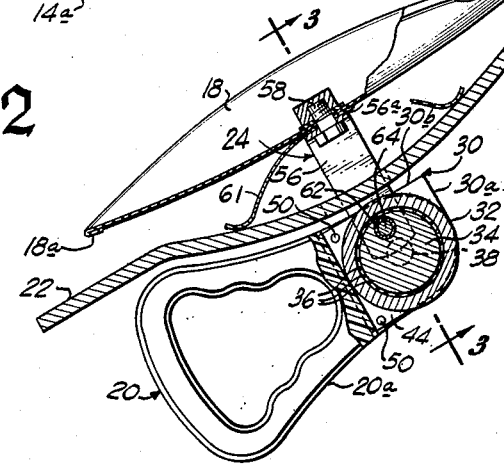
Fig. 3 is a sectional view of the device of Fig. 2 taken along the line 3—3 thereof assuming the entire structure to be shown therein.
Figure 3:
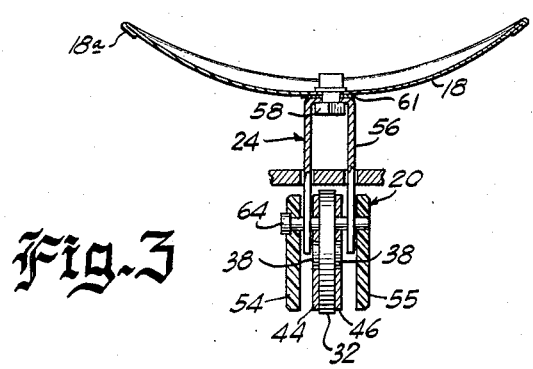

Briefly considered, in sealing the vessel 14, the cover 18 is inserted into the opening in the vessel 14 by pivoting the brace 22 clockwise as viewed in Figs. 2, 4 and 5 while the camming assembly 20 is in the position shown in Fig. 2. As shown in Fig. 2, the cover 18 may thus be inserted into the vessel 14 since it is in its warped condition. After the brace 22 is moved into engagement with a bracket 25 provided on the housing 14 the camming assembly 20 is rotated counterclockwise to the position shown in Fig. 4 thereby to draw portions of the cover 18 into engagement with the gasket 16. The portions of the cover 18 which engage the gasket 16 lie close to the major axis of the ellipse defined by the bead 18a, the other portion of the bead 18a being spaced from the gasket 16 because of the warped shape of the cover 18. Finally the vessel 14 is hermetically sealed by flexing the cover 18 to its unwarped sperical condition by rotating the camming assembly to the position shown in Fig. 5.

Since a relatively small force is required to move the warped inoperative cover 18 into engagement with the gasket 16 and a considerably greater force is required to flex the cover 18 to the unwarped operative condition, in order to facilitate manual closure of the container 14 while minimizing the space requirements of the camming assembly 20, the cam surface is divided into two parts. The first part is used to move the warped cover 18 into engagement with the gasket 16 and the second part includes a relatively frictionless camming surface so as to facilitate manual application of the high force required to flex the cover 18 into sealing contact with gasket 16.

Considering in detail the camming assembly 20 for flexing the cover 18 to effect a tight closure of the vessel 14, the cross-brace 22 is pivotally mounted on a suitable pivot pin 26 provided in the supporting structure 11 diametrically opposite the bracket 25 so that when the vessel 14 is opened by withdrawal of the closure 18 therefrom, the cross-brace 22 serves as a hinge for pivotally supporting the cover 18 in a position adjacent the opening in the vessel 14. In order to facilitate insertion and withdrawal of the cover 18 into and out of the vessel 14 the pintle 26 may be slidable along a line parallel to the principal axis of the brace 22 and is preferably spring biased to the left as viewed in the drawings.

The camming assembly 20, which is preferably made of a suitable heat resistant plastic, such as, for example, a phenolic condensation product, has an integral operating arm and handle portion 20a which is provided with the first camming surface 30. The second or high force applying portion of the camming assembly 20 comprises a circular ring 32 which is rotatably journaled in the arm 20a on a needle bearing assembly comprising a cylindrical inner race 34 and a plurality of needle bearings 36 which are contiguously arranged between the race 34 and the ring 32. It will be clear to those skilled in the art that the outer ring 32 constitutes the outer race of a double race needle bearing assembly and is freely rotatable about the central axis of the bearing. The inner race 34 is supported in the arm 20a on outwardly directed axial supporting studs 38 which are received in suitable apertures 40 and 42 in a pair of side mounting plates 44 and 46. The plates 44 and 46 have rectangularly extending portions 44a and 46a which are respectively apertured for receiving the mounting pins 50 which extend through the member 20a and through both plates 44 and 46. Also, the arm portion 20a on the handle 20 is provided with a pair of parallel grooves 52 into which the side plates 44 and 46 extend so as to insure that the plates 44 and 46 and, consequently, the camming ring 32 is fixedly positioned in the arm 20a.

For the purpose of providing the first camming portion 30 which acts prior to the action of the second camming portion 32 as the arm 20a is rotated to close the vessel 14, the arm 20a is provided with a bifurcated end portion comprising the side members 54 and 55 which extend outwardly beyond the ring 32 in the upper portion of the camming mechanism as viewed in Fig. 1 to provide the extending portions 30 which first engage the brace 22 as the arm 20a is rotated from the position shown in Fig. 2 to the position shown in Fig. 4.

For the purpose of connecting the cover 18 to the arm 20a so as to provide relative movement between the center portion of the cover 18 and the seat 16 of the vessel 14, the bracket assembly 24 comprises a U-shaped yoke 56 secured at the web 56a thereof by a bolt assembly 58 to the cover 18 with the ends of the yoke 56 extending through suitable slots 60 provided in the brace 22. As shown, the yoke 56 is loosely received in the slots 60 so that there is sufficient play between the cover 18 and the brace 22 to simplify the insertion and withdrawal of the cover into and out of the vessel 14. A suitable compression spring 61 between cover 18 and brace 22 forces the brace 22 to ride firmly on camming assembly 20. The camming assembly 20 is mounted for free rotation on a split ring bushing 62 frictionally gripping a headed pin 64, the ends of the pin 64 projecting through holes 66 formed in the arms 54 and 55 of the handle 20 and through holes 68 formed in the upwardly extending arms of the yoke 56. Consequently, as the arm 20a is moved from the position shown in Fig. 2 to the position shown in Figs. 1 and 5, it pivots about the pin 64.

Considering now the operation of the closure mechanism of the present invention, let it be assumed that the cover 18 is in its warped condition and may be readily inserted within the circular opening of the vessel 14 by pivoting the brace 22 through the position shown in Fig. 2 until the brace 22 engages the bracket 25. At this time the peripheral bead 18a on the cover 18 is spaced, at the closest point, approximately one-quarter inch away from the gasket 16, and the arm 20a occupies the relative operating position shown in Fig. 2. The pintle 64 at this time is at its closest position with respect to the brace 22. In order to effect the closure of the vessel 14, the arm 20a is next rotated counterclockwise as viewed in Figs. 2, 4 and 5, to the position shown in Fig. 4. It may be seen by comparing the positions of the pintle 64 in Figs. 2 and 4 that the distance between the center of the cover 18 and the center of the brace 22 is decreased by a considerable amount during this ninety-degree movement of the arm 20a. At this time, however, the cover 18 is still warped. It may be seen that during the movement of the arm 20a from the position shown in Fig. 2 to that shown in Fig. 4 the camming surfaces 30 are slidably moved along the top of the brace 22. Consequently, the brace 22 may have a polished outer surface to facilitate this movement of the cam surfaces 30. Although this rubbing of the cam surfaces 30 along the brace 22 presents some frictional force which must be overcome in rotating the arm 20a, this is unobjectionable since this frictional force is actually slight owing to the fact that little, if any, force is required to move the warped cover 18 into partial engagement with the seat 16.

As shown, the cam surfaces 30 are constituted by very small radii curves which connect the orthogonally meeting planes 30a and 30b of the arm 20a. As described hereinafter, it is important that the arm 20a have a flat area between the cam surface 30 and the ring 32 so that the cam assembly may be self-biased or stabilized in the intermediate position of Fig. 4 when the vessel 14 is pressurized.

As indicated above, the force required to flex the cover 18 from the warped to the unwarped condition is relatively great and it has been found that the frictional force which would have to be overcome in order to rotate the handle from the position shown in Fig. 2 to that shown in Fig. 4 if the second camming portion were integral with the first camming portion 30 would be excessive, and therefore, the operation of the unit by a minimum force would be particularly difficult. However, by providing a relatively frictionless second camming surface which provides the high force necessary to permit flexing of the cover 18 by the manual application of a relatively small force, the unit can be operated with ease. Another important requirement met by the camming assembly 20 is that of compactness so that a relatively short lever arm 20a is used to flex the cover 18.

After the vessel 14 has been closed in the manner described above, the internal pressure thereof is raised by any suitable means to the desired level. When the unit 10 is used for ordinary purposes, such, for example, as cooking or sterilizing, the pressure differential between the opposite faces of the cover 18 is sufficient to maintain the cover 18 in the spherical unwarped condition and insure the hermetic sealing of the vessel 14. Consequently, after the internal pressure of the vessel has been elevated to the desired operating value, the camming assembly 20 may be rotated clockwise to the position shown in Fig. 4, and because of the flat 30a located between the ring 32 and the cam surface 30 the assembly 20 is in a stable position and will remain in such position by virtue of compression spring 61 until moved by the application thereto of an external force. It may be seen that the intermediate cam portion 30a is operatively lower than the cam surfaces 30 and 32. Upon completion of the cooking or sterilizing operation, the pressure in the vessel 14 is lowered to atmospheric pressure and the cover 18 snaps back of its own accord to the warped shape of Fig. 4 which gently breaks the seal permitting the cover 18 to protect the operator. If the vessel 14 has been pressurized by steam, a small amount of steam is released at this time, because, obviously, the cover 18 will snap to the warped condition before the internal pressure of the vessel 14 is exactly equal to atmospheric pressure. As a practical matter, however, very little steam is released.

An important feature of this invention is that if the camming assembly is placed in the position shown in Fig. 4 while the vessel 14 is pressurized the cover 18 unflexes of its own accord as the internal pressure approaches atmospheric. This self-opening feature acts as a signal to notify the operator that the cooker may now be fully opened while otherwise the time of opening becomes speculative and may be dangerous if an attempt is made to open the cooker prematurely. Moreover, because the cover 18 remains in position over the opening in the vessel 14 at the time that the seal is first broken, there is no change of burning the operator as might be possible if the entire door were opened as shown in Fig. 2.

While the invention has been described in connection with a particular embodiment thereof, it will be understood that various modifications may be made thereon which are within the true spirit and scope of the invention as defined in the appended claims.

What is claimed as new and is desired to be secured by Letters Patent of the United States is:

1. In a vessel of the type comprising a container having an opening therein and a flexible cover movable from a warped to an unwarped condition so as to hermetically seal said vessel, said cover when not subjected to external stresses having a generally elliptical projected area and when subjected to external stresses having a generally circular dished shape with a central concavo-convex portion, the combination of a brace on said container, a member secured to the central portion of said cover, and a manually rotatable cam for exerting a force between said brace and said member to draw said cover into engagement with a seat on said container and to flex said cover from its warped to its unwarped condition thereby sealing said vessel, said cam being operatively interposed between said brace and said member, said cam having a first portion for moving said cover to a position in which it partially contacts the seat of said container and having a second portion for flexing said cover from the warped to the unwarped condition and thus into tight sealing engagement with said container, said second portion being a rotatably mounted circular member and said first portion being part of a support in which said circular member is mounted.

2. The combination of claim 1 in which said cam has a third portion intermediate said first and second portions, said third portion being operatively lower than said first and second portions and constituted by a portion of said support, whereby said cam is in a stable position when said third portion is in operative engagement with said brace.

3. In a closure apparatus for a container having an opening therein, the combination of a cover insertable into said container through said opening and engageable with a seating surface on said container surrounding said opening, a U-shaped yoke secured to said cover and having its arms extending outwardly of the container, a brace having its ends engageable with the top of said container, said brace having openings receiving the arms of said yoke, a pintle carried between the arms of said yoke, a manually rotatable arm and associated cam on said pintle and having its edge engageable with said beam, said cam having a first camming surface for moving said cover into engagement with the seating surface and a second camming surface for flexing the cover, said second camming surface being provided by means of a circular member rotatably supported by said arm.

4. A closure assembly for use with a vessel having an access opening therein and an inwardly directed seat surrounding said opening, said closure assembly comprising a flexible cover positionable within said vessel, and means hingedly attached to said vessel for forcing said cover into sealing engagement with said seat, said means including a camming assembly, pivot means in which said camming assembly is pivotally mounted with respect to said cover, said camming assembly having at least four separate cam portions, a first portion being provided for moving the cover into contact with said seat, a second portion being provided for forcing said cover tightly against said seat a third portion positioned between said first and second portions and disposed closer to said pivot means than either of the first and second cam portions whereby said cam has a position of stability between the other of said cam portions, and a fourth portion adjacent said first portion, said fourth portion being disposed closer to said pivot means than any of the other of said cam portions to permit sufficient relative movement between said cover and said seat to enable the insertion of said cover into the access opening in said vessel.

5. A camming assembly for moving a first member relative to a second member, said camming assembly comprising an arm, pivot means mounted on said first member, said arm being pivotally mounted on said pivot means adjacent said second member, a first camming means on said arm for engaging said second member to move said first and second members in one direction with respect to one another, and a second camming means constituted by rotatable means journaled in said arm for rolling engagement with said second member to cause a further movement of said first and second members relative to one another in said one direction.

6. A camming assembly for moving a first member relative to a second member, said camming assembly comprising an arm, pivot means mounted on said first member, said arm being pivotally mounted on said pivot means adjacent said second member, a first camming means on said arm for engaging said second member to move said first and second members in one direction with respect to one another, a second camming means constituted by a rotatable member journaled on said arm for rolling engagement with said second member to cause a further movement of said first and second members relative to one another in said one direction, and a stop integral with said arm for engagement with said second member to limit the angle of rotation of said arm and to coact with said second camming means to maintain said members a fixed distance apart.

7. A camming assembly for closing the cover of a sealable vessel, comprising an operating arm pivotally connected to said cover, a circular cam rotatably mounted on said arm with at least one edge of said cam extending beyond a marginal edge of said arm, and a camming surface of said arm disposed adjacent said edge of said cam, and the axis of rotation of said cam being displaced from the pivotal axis of said arm, and said pivotal axis being disposed within the periphery of said circular cam.

8. A camming assembly as set forth in claim 7 wherein said arm is bifurcated and said cam is journaled between the bifurcations of said arm.

9. A camming assembly as set forth in claim 7 wherein said camming surface includes a flat surface which provides a stable position on said cam.

10. A closure assembly for use with a vessel having an access opening therein and an inwardly directed seat surrounding said opening, said closure assembly comprising a flexible cover positionable within said vessel, and means hingedly attached to said vessel for forcing said cover into sealing engagement with said seat, said means including a camming assembly, pivotal means in which said camming assembly is pivotally mounted with respect to said cover, said camming assembly having at least four separate cam portions, a first portion being provided for moving the cover into contact with said seat, a second portion being provided for forcing said cover tightly against said seat, an intermediate portion positioned between said first and second portions and disposed closer to the pivotal axis of said pivot means than either of the first and second cam portions whereby said cam has a position of stability between the other of said cam portions, and a rest portion adjacent said first portion, said rest portion being disposed closer to said pivotal axis than any of the other of said cam portions to permit sufficient relative movement between said cover and said seat to enable the insertion of said cover into the access opening in said vessel.

References Cited in the file of this patent

UNITED STATES PATENTS

| | | |
|---|---|---|
| 1,145,672 | Carpenter et al. | July 6, 1915 |
| 1,664,972 | Dudderar | Apr. 3, 1928 |
| 2,094,779 | Donaldson | Oct. 5, 1937 |
| 2,538,661 | Vischer | Jan. 6, 1951 |

FOREIGN PATENTS

| | | |
|---|---|---|
| 440,922 | Italy | Oct. 20, 1948 |
| 260,266 | Switzerland | July 16, 1949 |
| 718,108 | Great Britain | Nov. 10, 1954 |